United States Patent
Ma et al.

(10) Patent No.: US 8,611,203 B2
(45) Date of Patent: *Dec. 17, 2013

(54) CODING INFORMATION FOR COMMUNICATION OVER AN ORTHOGONAL FREQUENCY DIVISION MULTIPLE ACCESS (OFDMA)-BASED WIRELESS LINK

(75) Inventors: Jianglei Ma, Kanata (CA); Ming Jia, Ottawa (CA); Mo-Han Fong, Ottawa (CA); Peiying Zhu, Kanata (CA); Wen Tong, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/456,867

(22) Filed: Apr. 26, 2012

(65) Prior Publication Data

US 2012/0207118 A1 Aug. 16, 2012

Related U.S. Application Data

(63) Continuation of application No. 12/266,772, filed on Nov. 7, 2008, now Pat. No. 8,189,455.

(60) Provisional application No. 60/986,080, filed on Nov. 7, 2007.

(51) Int. Cl.
H04J 11/00 (2006.01)
H04B 1/00 (2006.01)

(52) U.S. Cl.
USPC ............... 370/208; 370/252; 375/143

(58) Field of Classification Search
USPC .......................... 370/208, 252, 328
See application file for complete search history.

(56) References Cited

U.S. PATENT DOCUMENTS

| | | |
|---|---|---|
| 2005/0286465 A1 | 12/2005 | Zhuang |
| 2008/0318567 A1 | 12/2008 | Popovic et al. |
| 2009/0110034 A1 | 4/2009 | Kowalski |
| 2009/0181155 A1 | 7/2009 | Walser |
| 2009/0209264 A1 | 8/2009 | Yang et al. |
| 2009/0310703 A1 | 12/2009 | Han et al. |
| 2010/0142436 A1 | 6/2010 | Hart et al. |
| 2010/0173642 A1 | 7/2010 | Iwai et al. |
| 2010/0210274 A1 | 8/2010 | Iwai et al. |

OTHER PUBLICATIONS

3GPP TS 36.213 V8.3.0 (May 2008), 3rd Generation Partnership Project; Technical Specification Group Radio Access Network; Evolved Universal Terrestrial Radio Access (E-UTRA); Physical layer procedures (Release 8), 45 pages (May 2008).

Xiao-Dong Li et al., PCT/US2008/008810, filed Jul. 16, 2008, entitled "Providing Space Division Multiple Access in a Wireless Network," pp. 1-18, Figs. 1-3B.

*Primary Examiner* — Andrew Lee
(74) *Attorney, Agent, or Firm* — Finnegan, Henderson, Farabow, Garrett & Dunner LLP

(57) ABSTRACT

In a wireless access network, a transmitter provides a pool of sequences having a reduced peak-to-average power ratio. Information to be transmitted is mapped to a selected at least one of the pool of sequences. The selected at least one sequence is transmitted over an orthogonal frequency division multiple access (OFDMA)-based wireless link of the wireless access network.

20 Claims, 3 Drawing Sheets

CODING INFORMATION FOR COMMUNICATION OVER AN ORTHOGONAL FREQUENCY DIVISION MULTIPLE ACCESS (OFDMA)-BASED WIRELESS LINK

CROSS-REFERENCE TO RELATED APPLICATIONS

This is a continuation of application Ser. No. 12/266,772, filed Nov. 7, 2008 and claims the benefit of U.S. Provisional Application No. 60/986,080, filed Nov. 7, 2007, all of which are incorporated herein by reference.

TECHNICAL FIELD

The invention relates generally to coding data for communication over an orthogonal frequency division multiple access (OFDMA)-based wireless link.

BACKGROUND

Various wireless access technologies have been proposed or implemented to enable mobile stations to perform communications with other mobile stations or with wired terminals coupled to wired networks. Examples of wireless access technologies include GSM (Global System for Mobile communications) or UMTS (Universal Mobile Telecommunications System) technologies, defined by the Third Generation Partnership Project (3GPP); CDMA 2000 (Code Division Multiple Access 2000) technologies, defined by 3GPP2; or other wireless access technologies.

As part of the continuing evolution of wireless access technologies to improve spectral efficiency, to improve services, to lower costs, and so forth, new standards have been proposed. One such new standard is the Long Term Evolution (LTE) standard from 3GPP, which seeks to enhance the UMTS wireless network.

Another type of wireless access technology is the WiMax (Worldwide Interoperability for Microwave Access) technology. WiMax is based on the IEEE (Institute of Electrical and Electronics Engineers) 802.16 Standard. The WiMax wireless access technology is designed to provide wireless broadband access.

In some wireless access technologies, orthogonal frequency division multiple access (OFDMA) is employed for wireless communications between a base station and a mobile station. OFDMA enables multiple access by multiple users using the orthogonal frequency division multiplexing (OFDM) technology. OFDM defines a relatively large number of closely-spaced orthogonal sub-carriers for carrying data. Data can be divided into several parallel data streams that are communicated over respective sub-carriers. With OFDM, the frequencies of the sub-carriers are selected such that the sub-carriers are orthogonal to each other, which eliminates or reduces cross-talk between the sub-carriers. With OFDMA, different OFDM sub-carriers are assigned to different users, such that data for multiple users can be sent in parallel between the base station and mobile station.

OFDMA used in the uplink (from mobile station to base station) provides various benefits, such as superior diversity gain, more convenient and flexible multi-user multiplexing, reduced complexity at the mobile station since no additional digital Fourier transform (DFT) processing is required, and superior MIMO (multiple input multiple output) decoding performance. MIMO refers to wireless transmission in which the transmitter has multiple antennas (multiple output) and the receiver also has multiple antennas (multiple input). The multiple antennas at the transmitter and receiver can correspond to the multiple sub-carriers used with OFDM.

However, use of OFDMA in the uplink can result in more expensive power amplifiers in transmitters of mobile stations due to larger power amplifier backoff requirements. Power amplifier backoff refers to operating the power amplifier at an output power level that is lower than the peak power level. A larger power amplifier backoff (lower average power level relative to the peak power level) reduces the efficiency of the power amplifier. Another issue associated with use of OFDMA in the uplink may be reduced link budget, which represents the expected received power at a receiver due to the transmitted power, antenna gains, and any losses in the medium, such as propagation losses and other losses. Reduced link budget means a lower expected received power at a receiver, such that the coverage that can be provided for mobile stations within a cell is reduced.

Thus, the limited transmit power used with OFDMA causes cell coverage and throughput to be limited.

SUMMARY

In general, according to an embodiment, a method for use in a wireless access network includes providing a sequence having a low peak-to-average ratio (PAPR) to enable efficient transmission over an orthogonal frequency division multiple access (OFDMA)-based wireless link of the wireless access network.

Other or alternative features will become apparent from the following description, from the drawings, and from the claims.

DETAILED DESCRIPTION

Figure 1:
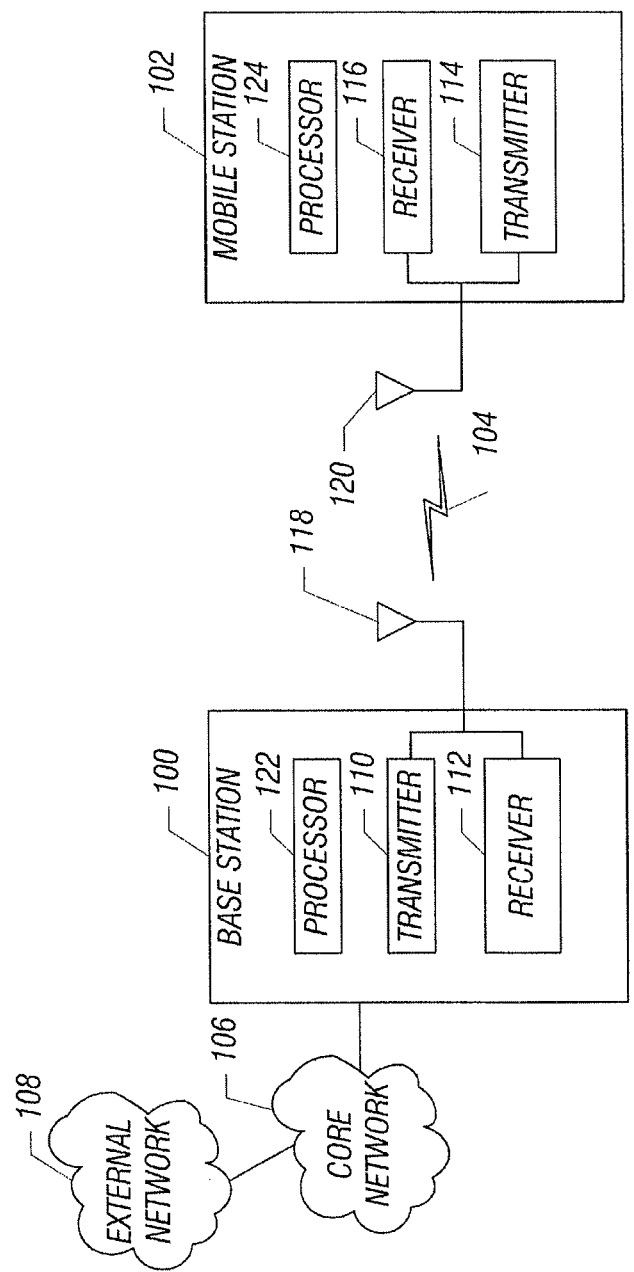
FIG. 1 is a block diagram of an exemplary communications network in which a wireless access network incorporating an embodiment of the invention can be provided.

In the following description, numerous details are set forth to provide an understanding of some embodiments. However, it will be understood by those skilled in the art that some embodiments may be practiced without these details and that numerous variations or modifications from the described embodiments may be possible.

In general, according to some embodiments, a low reduced PAPR (peak-to-average-power ratio) coding scheme is applied in a frequency domain to enhance performance of OFDMA (orthogonal frequency division multiple access)-based wireless communications (communications between mobile stations and base stations). A "base station" is a wireless access network entity that is responsible for wireless communications with a mobile station. A base station can include a base transceiver station (BTS) and a base station controller or radio network controller, for example. OFDMA communications refer to wireless communications in which an OFDMA technology is used. OFDMA enables multiple access by multiple users using the orthogonal frequency division multiplexing (OFDM) technology, which defines multiple closely-spaced orthogonal sub-carriers for carrying data.

To enhance coverage within a cell for OFDMA-based wireless communications, the low PAPR coding scheme uses a pool of sequences that have a low PAPR for coding data in the frequency domain. A low PAPR sequence (also referred to as a low cubic metric (CM) sequence) refers to a collection of information that has a relatively good autocorrelation characteristic. Ideally, the autocorrelation of a low PAPR (or low CM) sequence is the autocorrelation provided by a delta impulse function (also referred to as a Dirac delta function). One example of such a low PAPR sequence is a Zadoff-Chu sequence. A Zadoff-Chu sequence is a complex-valued mathematical sequence which, when applied to a signal to be communicated wirelessly, results in an electromagnetic signal of constant amplitude. In one embodiment, multiple differently cyclic phase shifted versions of an initial low PAPR sequence can be generated to provide the pool of low PAPR sequences. In alternative embodiments, the pool of low PAPR sequences can be generated without application of cyclic phase shifts.

Other low PAPR sequences can also be used, including binary sequences with a low PAPR. The PAPR is a power characteristic that defines the average output power level of a power amplifier in a transmitter relative to the peak power. A higher PAPR means that the power amplifier of the transmitter has to operate at a lower average power level. On the other hand, a low PAPR means that the power amplifier at the transmitter can operate at a higher average power level relative to the peak power. The term "low" or "reduced" PAPR in the context of OFDMA-based communications refers to any PAPR that is reduced according to a PAPR reduction mechanism (such as by using the sequences discussed above) such that the PAPR associated with the OFDMA-based communications is lower or reduced when compared to conventional OFDMA-based communications that are associated with relatively high PAPR. In some implementations, the low PAPR that can be achieved using techniques according to some embodiments is on the order of the PAPR provided by a single-carrier, frequency division multiple access (SC-FDMA) communications system. However, the low PAPR that can be achieved in OFDMA communications can be accomplished without having to apply digital Fourier transform (DFT) of fast Fourier transform (FFT) to spread data over multiple sub-carriers, as performed with SC-FDMA, which adds complexity.

Increased average power level of signals transmitted by a transmitter enhances the coverage area of the transmitter, which means that a mobile station that is located far away from a base station within a cell can be provided with enhanced coverage and throughput associated with lower error rates.

Information to be transmitted is mapped to a selected at least one of the pool of low PAPR sequences. The selected at least one low PAPR sequence is then modulated and transmitted wirelessly over the OFDMA-based wireless link.

In some embodiments, the low PAPR coding scheme is applied to information transmitted on the uplink (from a mobile station to a base station). For example, the low PAPR coding scheme can be applied to control channels communicated over the uplink from a mobile station to a base station.

The low PAPR coding scheme can also be applied on certain uplink data (e.g., bearer data such as voice data or packet data). In some embodiments, for uplink transmission of data, an adaptive selection mechanism adaptively selects between different coding schemes, which include a regular coding scheme and a low PAPR coding scheme that uses the low PAPR sequence discussed above. In one embodiment, the "regular" coding scheme includes application of forward error correction (FEC) coding, which generates an FEC code that is provided with transmitted information to enable error recovery at the receiver side. Note that FEC coding can also be used with the low PAPR coding scheme, except that the low PAPR coding scheme transmits the FEC coded data using a low PAPR signal. Thus, in one embodiment, regular coding refers to FEC coding, while low PAPR coding refers to FEC coding plus communication of the FEC coded data using a low PAPR signal. However, in an alternative embodiment, low PAPR coding can omit FEC coding—in other words, if low PAPR coding is employed, then FEC coding is omitted.

The regular coding scheme is selected for uplink data transmission if the mobile station is a "high geometry" mobile station, which means that the signal-to-noise ratio (SNR) of uplink communications for this mobile station is relatively good (above some predefined threshold, for example). On the other hand, for a low geometry mobile station, which has an SNR below the predefined threshold, the low PAPR coding scheme can be applied to the uplink data transmission. By using the low PAPR coding scheme for low geometry mobile stations, coverage for such low geometry mobile stations can be improved. A low geometry mobile station can be a mobile station located at a cell edge, or a mobile station located somewhere in the cell in which an obstruction between the mobile station and base station prevents high quality wireless communication.

Although reference is made to applying the low PAPR coding scheme for uplink communications, it is noted that the low PAPR coding scheme can also be applied to downlink communications (from a base station to a mobile station).

FIG. 1 illustrates a communications network that includes a base station 100 that is able to communicate with a mobile station 102 over a wireless link 104. The base station 100 and mobile station 102 are each considered a wireless communications device. The base station 100 is part of a wireless access network, which can include many base stations to provide coverage for respective coverage areas (cells). Each base station 100 can communicate with multiple mobile stations within the coverage area of the base station.

The base station 100 is in turn connected to a core network 106 associated with the wireless access network. The core network 106 includes nodes, such as gateway nodes, to interface the wireless access network to an external network 108, which can be an external data network (e.g., Internet) or public switched telephone network (PSTN)).

The core network 106 and wireless access network including the base stations 100 can operate according to one of various different technologies, including as examples: GSM (Global System for Mobile communications) or UMTS (Universal Mobile Telecommunications System) technology, defined by the Third Generation Partnership Project (3GPP); CDMA 2000 (Code Division Multiple Access 2000) technology, defined by 3GPP2; Long Term Evolution (LTE) technology from 3GPP, which is an enhancement of the UMTS technology; WiMax (Worldwide Interoperability for Microwave Access) technology, as defined by IEEE (Institute of Electrical and Electronics Engineers) 802.16 standards; and other technologies.

The base station 100 includes a transmitter 110 and a receiver 112, and the mobile station 102 includes a transmitter 114 and receiver 116. The transmitter 110 in the base station 100 is used to transmit downlink information through an antenna assembly 118 of the base station 100 over the wireless link 104. The downlink information is received by the receiver 116 of the mobile station 102 through an antenna assembly 120 of the mobile station 102.

In the other direction, uplink information is transmitted by a transmitter 114 in the mobile station 102 through the mobile station antenna assembly 120 over the wireless link 104. The uplink information is received by the receiver 112 in the base station 100 through the base station antenna assembly 118.

The base station 100 further includes a processor 122, and the mobile station 102 includes a processor 124. The processors 122 and 124 control respective tasks performed by the base station 100 and mobile station 102, respectively, including transmission and reception of information over the wireless link 104.

In accordance with some embodiments, certain uplink information (e.g., uplink data associated with a low geometry mobile station and uplink control channels) is coded using a low PAPR coding scheme. In some implementations, the low PAPR coding scheme is a code phase shift keying (CPSK) scheme. Thus, as depicted in FIG. 1, the transmitter 114 in the mobile station 102 is a CPSK transmitter, while the receiver 112 in the base station 100 is a CPSK receiver. Although not depicted in FIG. 1, note that the low PAPR coding in accordance with some embodiments can also be applied to certain downlink information (information sent from the base station transmitter 110 to the mobile station receiver 116).

Figure 2:
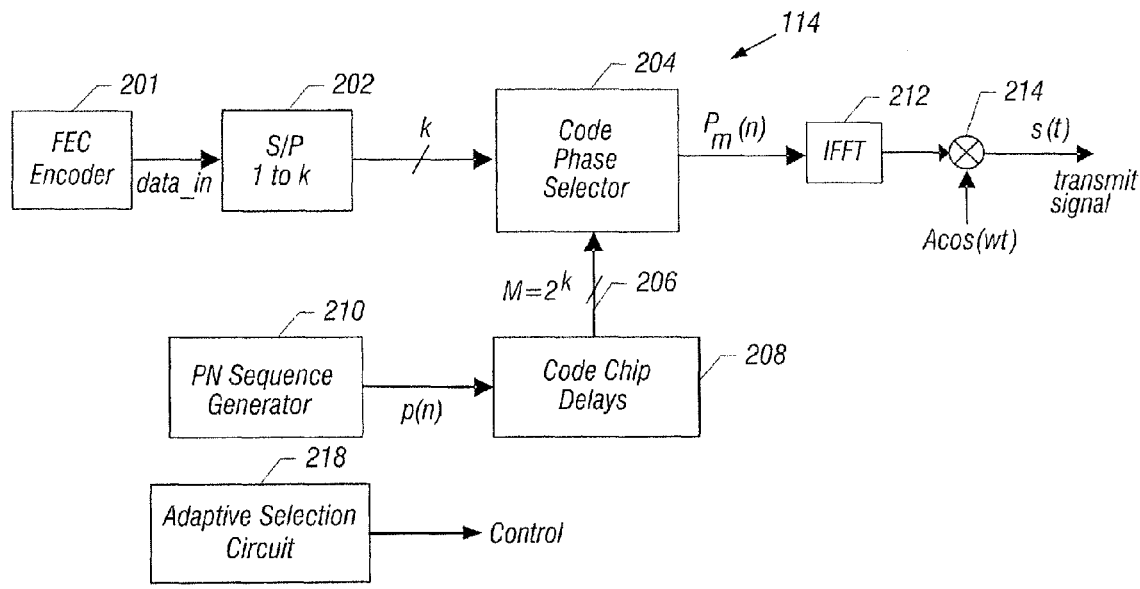
FIG. 2 is a block diagram of a code phase shift keying (CPSK) transmitter, according to an embodiment.

FIG. 2 shows the CPSK transmitter 114 according to an embodiment. Information to be transmitted by the CPSK transmitter 114 is represented as data_in (which can be uplink control channels or uplink data associated with a low geometry mobile station). The information to be transmitted, data_in, is a serial stream, in accordance with some implementations. The information, data_in, is output from an FEC encoder 201, which applies FEC encoding. The serial stream is converted by a serial-to-parallel converter 202 into a k-bit input to a code phase selector 204, where k≥2. In implementations in which data_in is provided as a k-bit input rather than a serial stream, the serial-to-parallel converter 202 can be omitted.

The code phase selector 204 is used to select one of M waveforms 206 that are also input into the code phase selector 204, where $M=2^k$. Each of the k-bit input is a binary bit. Thus, the M waveforms 206 that are provided as inputs to the code phase selector 204 correspond to the $2^k$ possible values of the k-bit input; in other words, each of the M waveforms corresponds to a particular value of the k-bit input. Depending on the value of the k-bit input, the code phase selector 204 selects the corresponding one of the M waveforms 206.

The M waveforms 206 are generated by a code chip delays circuit 208 that applies different cyclic phase shifts to a PN (pseudo-random noise) sequence p(n) that is input to the code chip delays circuit 208. The PN sequence p(n) has length L, where L>1. The PN sequence p(n) is produced by a PN sequence generator 210, and has a low target PAPR. In one example, as noted above, the PN sequence p(n) is a ZC sequence. In other implementations, other low PAPR sequences can be generated by the PN sequence generator 210.

M different cyclic phase shifts are applied to the PN sequence p(n) by the code chip delays circuit 208 to produce corresponding M waveforms 206. The M waveforms are also considered low PAPR sequences, since application of cyclic phase shifts does not change the low PAPR characteristic. The M waveforms make up a pool of low PAPR sequences. More specifically, the M different waveforms are expressed as $P_m(n)$, $1 \le m \le M$, where each $P_m(n)$ represents a corresponding waveform produced by the code chip delays circuit 208. Each waveform $P_m(n)$ is defined as:

$$P_m(n) = p(n - m_c),$$

where $m_c = m^* \lfloor L/M \rfloor$, and $1 \le m \le M$,
where the operator $\lfloor L/M \rfloor$ generates the largest integer value that is less than L/M, where L is the length of the PN sequence p(n).

The M $P_m(n)$ waveforms 206 are input to the code phase selector 204, and based on the k-bit input, the corresponding one of the waveforms is selected for output as $P_m(n)$ by the code phase selector 204. Effectively, the k-bit input is mapped to a selected one (or more) of the pool of M $P_m(n)$ waveforms 206. The selected $P_m(n)$ waveform is provided to an inverse fast Fourier transform (IFFT) circuit 212 to convert the $P_m(n)$ waveform, which is in the frequency domain, to a time domain signal. The converted signal is output to a modulator 214, which modulates the time domain signal to produce an output signal s(t) that is transmitted wirelessly on the uplink. In one embodiment, the modulation applied by the modulator 214 is a cosine modulation based on A cos(ωt), where ω represents the frequency of the carrier signal to carry the data to be transmitted.

The coding of the information data_in by the FEC encoder 201, code phase selector 204, code chip delays circuit 208, and PN sequence generator 210 of the transmitter 114 is an example of the low PAPR coding according to some embodiments. However, as discussed above, "regular" (non-low PAPR) coding can alternatively be applied on certain uplink information, such as uplink data of a high geometry mobile station. The regular coding includes FEC coding applied by the FEC encoder 201, while the code phase selector 204 is bypassed. In other words, the k-bit input provided by the serial-to-parallel converter 202 is provided to the IFFT circuit 212 without passing through the code phase selector 204 when regular coding is used. The selection between the low PAPR coding and regular coding can be performed by an adaptive selection circuit 218 that outputs a control signal to select between low PAPR coding and regular coding for data_in. In one example, the adaptive selection circuit 218 can be provided with information relating to whether the mobile station is a low geometry or high geometry mobile station, based on predefined measurements.

The low PAPR coding provided by the CPSK coding and modulation scheme of the CPSK transmitter 114 according to some embodiments provides increased power and bandwidth efficiency when compared to conventional M-ary BPSK (binary phase shift keying) DS (direct sequence) transmitters for a given processing gain. Also, just one code generator (code phase selector 204) is needed in the CPSK transmitter 114, for less complexity.

Also, the processing gain of the CPSK coding and modulation scheme can be adjusted through the ratio of L/k (by varying either or both of L and k). The processing gain can be set such that interference can be reduced.

In addition, the mechanisms employed by some embodiments of the invention enable a larger amount of information bits to be carried over a wireless link than can be accomplished using some traditional frequency domain schemes, such as the code division multiple access (CDMA) technology. In CDMA, one modulated symbol is spread using one spreading sequence; in an approach according to some embodiments, k information bits are mapped to one sequence directly. Since k can be any number (depending on the sequence length), a potentially greater amount of information bits can be carried.

Although reference has been made to CPSK coding using the circuitry of FIG. 2, it is noted that other forms of coding can be used instead that do not apply cyclic phase shifts. In such other embodiments, multiple PN sequence generators can be used to produce multiple low PAPR sequences that are mappable to the k-bit input. In such an embodiment, the code phase selector 204 is referred to more generally as a sequence selector to select from among plural sequences for mapping to the k-bit input.

Figure 3:
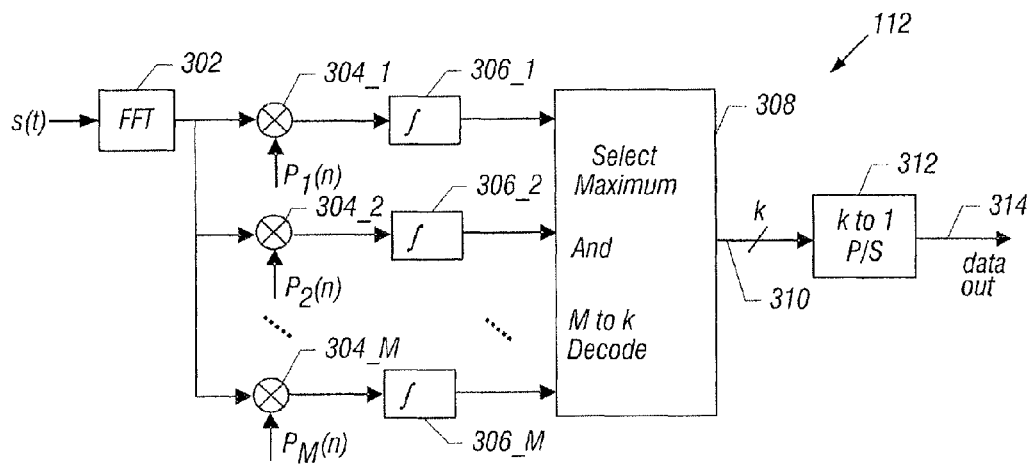
FIG. 3 is a block diagram of a CPSK receiver, according to an embodiment.

FIG. 3 shows the CPSK receiver 112 according to an embodiment. The receiver 112 receives the s(t) signal over the wireless link, and a fast Fourier transform (FFT) circuit 302 applies a fast Fourier transform on the received signal s(t) to convert the signal from the time domain to the frequency domain. The output signal from the FFT circuit 302 is provided in parallel to inputs of correlation circuits 304_1, 304_2, ..., 304_M. The correlation circuits 304_1 to 304_M are used to correlate the output signal from the FFT circuit 302 with one of the waveforms $P_1(n), P_2(n), \ldots, P_M(n)$, which are generated based on application of different cyclic phase shifts to a low PAPR sequence that is the same sequence used in the transmitter 114.

The outputs of the correlation circuits 304_1 to 304_M are applied to respective integration circuits 306_1 through 306_M. The outputs of the integration circuits 306_1 through 306_M are then provided to a selection and decoding circuit 308. The selection and decoding circuit 308 selects the most correlated one of the outputs from the integration circuits 306_1 through 306_M, where the most correlated output is the one with maximum power. The selected most correlated output is one of the waveforms $P_1(n), P_2(n), \ldots, P_M(n)$, with the selected waveform being represented as $P_i(n)$, i selected from 1 to M.

The selection and decoding circuit 308 then decodes the selected waveform $P_i(n)$ into a k-bit output 310 that is provided to a parallel-to-serial converter 312. The parallel-to-serial converter 312 produces an output serial stream 314, which can be communicated to an FEC decoder (not shown), and then communicated to the processor 122 (FIG. 1) in the base station 100, for example.

As discussed above, the CPSK coding and modulation scheme (one example depicted in FIGS. 3 and 4) can be applied to OFDMA to form CPSK-based OFDMA, with reduced PAPR (due to use of a low PAPR sequence to code data). In other words, the CPSK coded and modulated data is wirelessly transmitted in each sub-carrier of the multiple sub-carriers provided by the OFDMA technology.

To further enhance transmission efficiency, orthogonal CPSK O-CPSK-based OFDMA can be used. With O-CPSK, two PN sequences are used to code 2×k bits. The two coded data sequences are transmitted on the same frequency at the same time—this allows the coding rate to be reduced by a factor of 2. Orthogonality is achieved by modulating one coded data sequence using cosine modulation, and the other coded data sequence using sine modulation.

Figure 4:
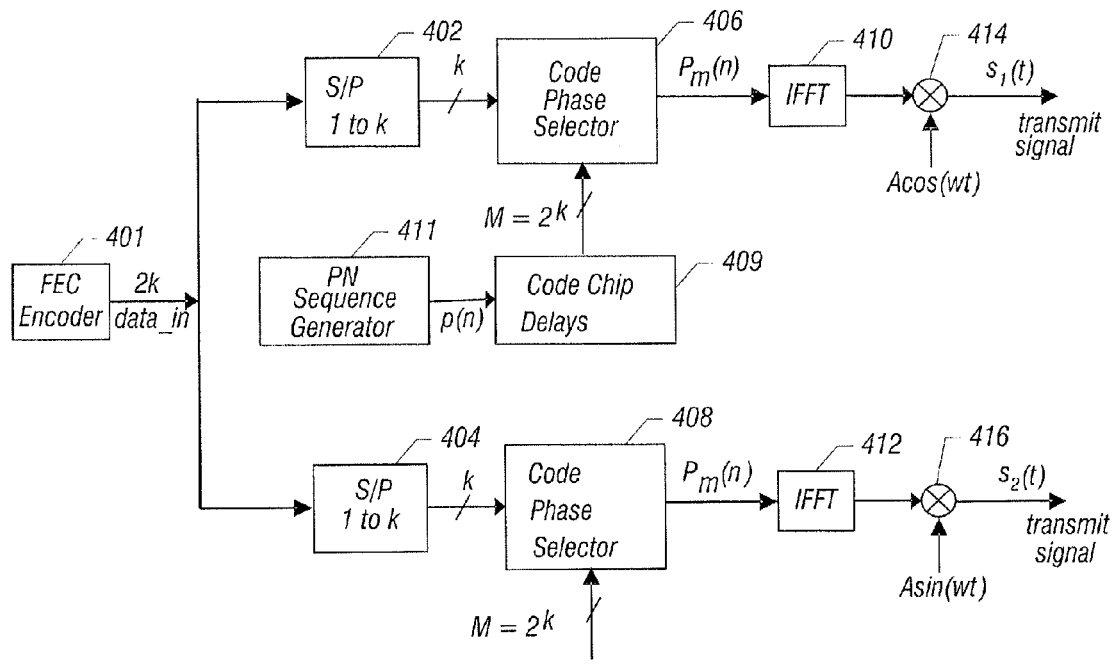
FIG. 4 is a block diagram of an orthogonal-CPSK (O-CPSK) transmitter, according to another embodiment.

FIG. 4 shows an O-CPSK transmitter (114A) according to an embodiment. A serial stream, data_in, of 2k bits is provided by an FEC encoder 401. Half (k bits) the input serial stream is provided to a first serial-to-parallel converter 402, and the other half (k-bits) of the serial input stream is provided to a second serial-to-parallel converter 404. Each of the serial-to-parallel converters 402 and 404 provides a corresponding k-bit input to a respective code phase selector 406 and 408.

Each of the code phase selectors 406 and 408 also receive M waveforms $P_m(n)$, $1 \leq m \leq M$. Note that the code phase selectors 406 and 408 receive the same set of M waveforms, which are produced by a code chip delays circuit 409 from a PN sequence p(n) provided by the PN sequence generator 411. In other words, the same PN sequence is used for producing the M waveforms. If the two k-bit inputs provided by the converters 402 and 404 have different values, the two different code phase selectors 406 and 408 will output different coded data sequences (in other words, different ones of the M waveforms will be selected by the code phase selectors 406 and 408). The selected waveforms from the respective code phase selectors 406 and 408 are provided to respective IFFT circuits 410 and 412. The outputs of the IFFT circuits 410 and 412 are provided to modulators 414 and 416, respectively, which apply respective cosine and sine modulations to the corresponding signals. Respective coded and modulated transmit signals $s_1(t)$ and $s_2(t)$ are output by the respective modulators 414 and 416 for 20 transmission over the wireless link. The cosine modulation applied by the modulator 414 is based on $A \cos(\omega t)$, and the sine modulation applied by the modulator 416 is based on $A \sin(\omega t)$. The signals $s_1(t)$ and $s_2(t)$ are transmitted concurrently.

Note that FIG. 4 can also similarly include an adaptive selection circuit similar to the adaptive selection circuit 218 of FIG. 2, to adaptively select between the low PAPR coding and regular coding.

Figure 5:
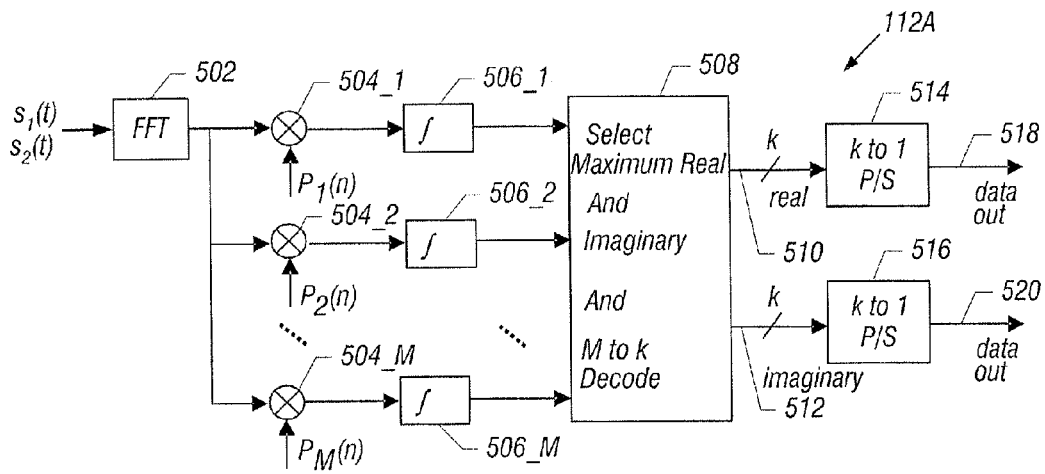
FIG. 5 is a block diagram of an O-CPSK receiver, according to another embodiment.

FIG. 5 shows an O-CPSK receiver (112A). The $s_1(t)$ and $s_2(t)$ signals are received together as a coded data sequence by the receiver 112A. Note that the baseband of the coded data sequence subject to the sine modulation is imaginary, whereas the baseband of the coded data sequence subject to cosine modulation is real. The received coded data sequence that is a combination of signals $s_1(t)$ and $s_2(t)$ is provided to an FFT circuit 502, which provides an output that is sent in parallel to correlation circuits 504_1 to 504_M. The outputs of the correlation circuits 504_1 to 504_M are provided to respective integration circuits 506_1 to 506_M. The functions of the correlation circuits 504_1 to 504_M and integration circuits 506_1 to 506_M are the same as the respective circuits shown in the transmitter 112 of FIG. 3.

The outputs of the integration circuits 506_1 to 506_M, which contain both real and imaginary parts, are provided to a selection and decoding circuit 508, which selects the best correlated real and imaginary parts (which corresponds to two waveforms $P_m(n)$ sent by the transmitter 114A). The two waveforms are then decoded into respective 2 k-bit outputs 510 and 512, which are then provided to respective parallel-to-serial converters 514 and 516. The parallel-to-serial converters 514 and 516 output respective serial output streams 518 and 520.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for coding control channel information for transmission in a long term evolution (LTE) wireless access network, comprising:
   mapping the control channel information to a selected at least one sequence of a pool of sequences having a reduced peak-to-average power (PAPR) ratio;
   modulating the selected at least one sequence having mapped control channel information; and transmitting the modulated selected at least one sequence over an orthogonal frequency division multiple access (OFDMA)-based wireless link of the LTE wireless access network.

2. The method of claim 1, wherein the OFDMA-based wireless link is an (OFDMA)-based uplink from a mobile station to a base station, the method further comprising transmitting the selected at least one sequence over the OFDMA-based uplink.

3. The method of claim 1, further comprising:
at a receiver, receiving the modulated selected at least one sequence and extracting the control channel information from the selected at least one sequence.

4. The method of claim 1, wherein providing the pool of sequences comprises providing a pool of Zadoff-Chu sequences.

5. The method of claim 1, wherein the modulated sequence is transmitted using multiple antennas.

6. The method of claim 1, further comprising:
generating a first sequence having a reduced peak-to-average power (PAPR);
applying plural different cyclic phase shifts to the first sequence to produce the pool of sequences.

7. The method of claim 1, wherein the control channel information has a first control channel information part and a second control channel information part, and wherein mapping the control channel information comprises mapping the first control channel information part to the selected at least one of the sequences, the method further comprising:
applying cosine modulation to the selected at least one sequence having the first control channel information part prior to transmission over the OFDMA-based wireless link;
mapping the second control channel information part to a second selected one of the sequences in the pool; and
applying sine modulation to the second selected sequence prior to transmission over the OFDMA-based wireless link.

8. A wireless transmitter for transmitting control channel information over a long term evolution (LTE) wireless link, the transmitter comprising:
a sequence generator configured to generate a pool of sequences having a reduced peak-to-average power (PAPR) ratio;
a sequence selector configured to map the control channel information to a selected at least one of the sequences in the pool;
a modulator configured to apply a modulation to the selected at least one sequence having mapped control channel information; and
a circuit to cause transmission of the modulated selected at least one sequence that represents the control channel information over an orthogonal frequency division multiple access (OFDMA)-based LTE wireless link.

9. The wireless transmitter of claim 8, further comprising at least one antenna configured to transmit the modulated selected at least one sequence.

10. The wireless transmitter of claim 8, wherein the control information includes a first control channel information part and a second control channel information part, and the sequence selector maps the first control channel information part, and the modulation comprises cosine modulation applied to the selected sequence that represents the first control channel information part, the transmitter further comprising:
a second sequence selector configured to map the second control channel information part to a second one of the sequences in the pool; and
a second modulator configured to apply sine modulation to the second selected sequence prior to transmission over the OFDMA-based LTE wireless link.

11. The wireless transmitter of claim 8, wherein the sequence generator comprises at least one pseudo-random number sequence generator.

12. The wireless transmitter of claim 8, wherein the sequence generator is also configured to produce a first sequence having the reduced PAPR, and to apply multiple different cyclic phase shifts to the first sequence to produce the pool of sequences.

13. The wireless transmitter of claim 12, wherein the sequence generator comprises a cyclic phase shift circuit to apply the different cyclic phase shifts to the first sequence to produce the pool of sequences.

14. The wireless transmitter of claim 13, wherein the control channel information has k bits, k≥2, and wherein the pool of sequences comprise $2^k$ sequences.

15. The wireless transmitter of claim 8, wherein the pool of sequences includes a pool of Zadoff-Chu sequences or a pool of binary sequences.

16. The wireless transmitter of claim 8, further comprising:
an adaptive selection circuit configured to select whether mapping of the control channel information is to be performed based on at least one criterion.

17. The wireless transmitter of claim 16, wherein selection of whether mapping of the control channel information is to be performed is based on whether a mobile station that the transmitter is part of is a low geometry mobile station or a high geometry mobile station.

18. The wireless transmitter of claim 8, further comprising at least two antennas configured to transmit the modulated selected at least one sequence.

19. A wireless receiver in a long term evolution (LTE) network comprising:
correlation circuits configured to correlate an input signal received over an orthogonal frequency division multiple access (OFDMA)-based LTE wireless link to respective ones of plural waveforms that are produced from application of difference cyclic phase shifts to a low peak-to-average power ratio sequence, the input signal including a modulated signal having control channel information mapped to one of the plural waveforms; and
a circuit to select one of the plural waveforms based on the correlations by the correlation circuits and to decode the selected waveform to control channel information that was transmitted by a transmitter over the OFDMA-based LTE wireless link.

20. The wireless receiver of claim 19, wherein the low peak-to-average power ratio sequence is a Zadoff-Chu sequence.

* * * * *